United States Patent [19]

Sayles

[11] 4,054,029

[45] Oct. 18, 1977

[54] NUCLEAR BLAST-RESISTANT ROCKET MOTOR CASES

[75] Inventor: David C. Sayles, Huntsville, Ala.

[73] Assignee: The United States of America as represented by the Secretary of the Army, Washington, D.C.

[21] Appl. No.: 645,870

[22] Filed: Dec. 29, 1975

[51] Int. Cl.[2] .......................... G21F 1/10; F02K 9/04; E08K 3/12

[52] U.S. Cl. .................................. 60/253; 60/200 A; 250/518; 252/478; 260/2 M

[58] Field of Search ............ 252/478; 60/200 A, 253; 260/2 M; 250/518

[56] References Cited

U.S. PATENT DOCUMENTS

| | | | |
|---|---|---|---|
| 3,256,253 | 6/1966 | Neumann et al. | 260/2 M X |
| 3,355,469 | 11/1967 | Herbstman | 260/2 M X |
| 3,466,219 | 9/1969 | Schwartz | 60/200 A X |
| 3,491,055 | 1/1970 | Talley | 252/478 X |
| 3,609,372 | 9/1971 | Vogel | 250/518 |
| 3,686,868 | 8/1972 | Chase et al. | 60/200 A |
| 3,866,792 | 2/1975 | Minke | 60/200 A |

*Primary Examiner*—Edward A. Miller
*Attorney, Agent, or Firm*—Nathan Edelberg; Robert P. Gibson; Jack W. Voigt

[57] ABSTRACT

An organometallic polymeric resin is used to impregnate glass filaments (or boron, graphite, carbon, etc.) which are employed in the fabrication of composite motor cases and inert components of a solid propulsion system. The resulting motor case or inert component has the ability of regulating the amount of damage that a nuclear blast would inflict on the solid propulsion system to a level which is below the threshold damage value and the system remains operable. The metal of the organometallic polymeric resin is integral with the resin molecule. The preferred metal is tin which is effective in imparting an ability to stop or slow the passage of photon energy because of its capacity to absorb such energy. Representative of the organometallic polymer is an organotin-containing acrylate polymer which is capable of undergoing polymerization into transparent, easily-formed, mechanically-strong, heat-stable glasses which are capable of stopping, or retarding the rate and amount of penetration of radiation from nuclear blasts. The boron, graphite, and carbon can be used as an additive to the composite motor case ingredients, or can be used along with glass fibers, or can be used separately as the major constituent of an inert motor component such as throat insert, nozzle, conical transition section, nozzle expansion cone, heat shield, insulation, and liner material.

5 Claims, No Drawings

NUCLEAR BLAST-RESISTANT ROCKET MOTOR CASES

DEDICATORY CLAUSE

The invention described herein may be manufactured, used, and licensed by or for the Government for governmental purposes without the payment to me of any royalties thereon.

BACKGROUND OF THE INVENTION

Filament-reinforced resin motor cases have been extensively used in the propulsion industry. Several advantages have resulted from employment of filament-reinforced resin motor cases. Some of the advantages include: lighter weight motor case, less insulation requirements for the filament-reinforced resin motor case, the ease of manufacture, storage, transportation, and stability against sparking or electrical conductance malfunctions.

A typical solid-propulsion rocket motor is composed of several layers of different materials; therefore, when the typical rocket motor is subjected to the radiation from a nuclear blast several modes of damage can result. The amount of this damage would be dependent upon the amount and the spectral distribution of the photon energy emitted from the burst and the absorptive characteristics of various materials, vaporization of the outer portions of material layers (which results in a compressive shock loading of the interior material), melting and internal heating can occur. The exterior layer of cork or similar thermal insulation which is usually employed on contemporary solid propellant systems serve as an effective absorber of the lower energy photons, however, the higher energy photons penetrate and cause heating of the internal structure with the consequent production of compressive stresses. As the stress field subsequently relaxes through the propagation of stress waves (as necessary to satisfy interface and boundary condition) transient tensile stresses of possibly damaging magnitude are produced.

Since the use of filament-reinforced resin motor cases has been well established, and well accepted in the propulsion field, an improvement to enable the case to withstand higher energy photons of the type associated with a nuclear blast environment would be advantageous. All of the advantages of a filament-reinforced resin motor case could be retained provided the improvement means were in harmony with the techniques of manufacture, the physical, qualitative, and mechanical and chemical properties required for the rocket motor case.

Therefore, an object of this invention is to provide an improved nuclear blast-resistant rocket motor case which utilizes a means for selectively absorbing, preventing, or slowing the penetrating radiation of the type associated with a nuclear blast environment.

A further object of this invention is to provide an improved nuclear blast-resistant rocket motor case which employs organotin polymers that provide a reduced degree of transparency to the radiation particles of a nuclear-blast environment.

Still another object is to provide inert rocket motor components which have a means included within for selectively absorbing, preventing, or slowing the penetrating radiation of the type associated with a nuclear blast environment.

SUMMARY OF THE INVENTION

Organometallic polymers, such as, the organotin-containing acrylate polymers which are capable of undergoing polymerization into transparent, easily-formed, mechanically-strong, heat-stable glasses which are capable of stopping or retarding the rate and amount of penetration of radiation of a nuclear blast environment, are employed to impregnate glass filaments (or boron, graphite, carbon, etc.) that are used in composite motor case fabrication and inert rocket motor component fabrication.

Examples of organometallic polymers, their method of preparation, and methods for their conversion into a prepolymer which can be used to impregnate glass filaments (or boron, graphite, carbon, etc.) from which a composite motor case or a rocket motor case can be fabricated, are set forth hereinbelow. In addition to a conventional method for preparation of a bifunctional heteroorganic compound, such as, bis(2-carballyloxyalkyl)dialkylstannanes, a method which is considerably more facile is disclosed. The preferred method disclosed is for production of bis(2-propenyl)-3,4-bis(dihydrostannano)-1,6-hexanedioate which can be converted into a prepolymer by at least two methods. These methods include making into a copolymerization product of acrylic acid which is readily crosslinked with diepoxide curing agent or the specified compound can be crosslinked with an alkyltin which will undergo addition to the residual unsaturated linkage.

DESCRIPTION OF THE PREFERRED EMBODIMENT

A prepolymer is the preferred form for the organometallic compound to be in that is used to impregnate the fibers which are employed in a filament-reinforced motor case. When in a prepolymer form, the organometallic compound can be readily crosslinked by using a suitable crosslinking agent. For example, the organometallic compound, bis(2-propenyl)-3,4-bis(dihydrostannano)-1,6-hexanedioate, can be crosslinked with 4,5-epoxycyclohexylmethyl-4',5'-epoxycyclohexylcarboxylate (UNOX 221), or it can be crosslinked with dimethyltin dihydride or tin tetrahydride since it will undergo addition to the residual unsaturated linkage of bis(2-propenyl)-3,4-bis(dimethylstannano)-1,6-hexanedioate.

The reaction scheme set forth below is availabe for preparation of a typical bifunctional heteroorganic compound.

Bifunctional heteroorganic compounds, such as, bis(2-carballyloxyalkyl)dialkylstannanes can be prepared by: (a) transesterification of bis(2-carbomethoxyalkyl)dialkylstannanes with allyl alcohol, and (b) by the addition of dialkyltin dihydride to allyl acrylates and methacrylates according to the scheme:

$$Me_2SnH_2 + 2H_2C{:}CH.CH_2.CH\ 2.CO_2.CH{:}CH_2 \rightarrow Me_2Sn[CH_2.CH_2.CO_2.CH_2.CH{:}CH_2]_2$$

One synthetic method for the preparation of the above compound was reported by Neumann (W. G. Neumann, H. Niermann and R. Somnar, Ann, 659, 27 (1962), and accomplished by the transesterification of the bis(2-carbomethoxyalkyl)dialkylstannanes by reaction with an alkanol in the presence of catalytic amounts of sodium methoxide.

Although the above method will yield a compound suitable for use in this invention, a peferred method is disclosed below since the preferred method described is considerably more facile. The compound has additional advantages, as disclosed below also.

The preferred method for preparation of the organometallic polymer comprises of reacting dimethyltin dihydride with allyl acrylate to produce the bis(2-propenyl)-3,4-bis(dihydrostannano)-1,6-hexanedioate. The reaction can be controlled so that addition only occurs at one unsaturated linkage, and polyaddition to form a polymer can be prevented through the use of a polymerization inhibitor. The reaction would be carried out in the presence of hydroquinone as the stabilizer. It would be carried out in a pressure vessel by heating at 90°–100° C for 1–2 hours. The bis(2-propenyl)-3,4-bis(-dihydrostannano)-1,6-hexanedioate is isolated by distillation under reduced pressure.

There are two methods available for its conversion into a prepolymer which can be used to impregnate glass filaments (or boron, graphite, carbon, etc.) from which a composite motor case can be fabricated.

1. The bis(2-propenyl)-3,4-bis(dimethylstannano)-1,6-hexanedioate is copolymerized with acrylic acid in proportions of 90 to 10 using an organic peroxide as a copolymerization cataylst. This prepolymer is subsequently crosslinked with 4,5-epoxycyclohexylmethyl-4',5'-epoxycyclohexylcarboxylate (UNOX 221) using slightly higher amounts of crosslinker than stoichiometrically required. This amounts to 1–2 weight percent based on the prepolymer.
2. The use of dimethyltin dihydride or tin tetrahydride (1–2 weight percent) can be used as a crosslinking agent since it will undergo addition to the residual unsaturated linkage which is present in the bis(2-propenyl)-3,4-bis(dimethylstannano)-1,6-hexanedioate.

This polymer can also be usd as a replacement for the phenolic resin which is the popular ingredient when reinforced with silica, fibrous carbon, graphite, asbestos, etc. for several of the inert components of the rocket motor, such as, throat insert, nozzle, conical transition section, nozzle expansion cone, heat shield, etc. It can also be used in the insulation and liner materials.

The selection of organotin compounds was based on its intermediary position on the Periodic Chart. The use of organotin polymers will provide a degree of transparency to the radiation particles. The hydrides of several other elements or mixtures of elements can be used in this application to control the desired level of transmissibility of radiation particles for optimum resistance to nuclear blast.

The selection of tin or other metal which can be made integral with the resin molecule is particularly attractive for rocket case use where the rocket will be operating within the atmosphere environment since the more complicated modes of construction for re-entry vehicles are not required. However, the motor case, as disclosed, does provide a much desired and needed improved motor case to provide the degree of protection required for selectively absorbing, preventing or slowing the penetration from an exoatmospheric or atmospheric blast from a nuclear detonation. The organometallic prepolymer can be readily used in established methods of rocket case construction whether it be in filament winding techniques, in molding, or in miscellaneous forming techniques, as employed also for inert motor components.

The organometallic prepolymer when used to impregnate filaments in a filament winding technique (glass fibers, boron, graphite, carbon, etc.) is generally applied to the filament just prior to being wound on the mandrel or grain (where the case is formed directly on the pre-cast and cured grain). In any of the uses, the organometallic is used in place of the resin component for the motor case construction or in the construction of the inert component for rocket motor. The inert component may be molded, extruded, or formed by other established techniques. These inert component of rocket motors include throat insert, nozzle, transition section, nozzle expansion cone, heat shield, etc. The inert component can also include the insulation and/or liner or barrier materials which are required in solid propellant rocket motors. The requirement for the use of one or more of the specified inert rocket motor components is determined by such variables as the rocket motor size, burning time of propellant, temperature of burning propellant, combustion exhaust products, the motor case design, and parameters of operation. The requirements and selection of the inert components can be made by one skilled in the art.

I claim:

1. In combination with a solid propellant rocket motor of the type that employs a solid propulsion system having a composite motor case constructed of filaments or fibers selected from glass, boron, graphite, and carbon with said filaments or fibers impregnated with a resinous product, the improvement to said composite motor case including a metal that is integral with the resin molecule of the resinous product which is effective in imparting an ability to stop or slow the passage of photon energy because of its capacity to absorb such energy; said improvement being effective in regulating the amount of damage that radiation from a nuclear blast would inflict upon the propulsion system to a level which is below the threshold damage value for the system to remain operable; said metal that is integral with the resin molecule being in the form of an organometallic prepolymer selected from the prepolymers consisting of bis(2-propenyl)-3,4-bis(dihydrostannano)-1,6-hexanedioate crosslinked with about 1 to 2 weight percent of a crosslinking agent selected from dimethyltin dihydride and tin tetrahydride and bis(2-propenyl)-3,4-bis(dihydrostannano)-1,6-hexanedioate reacted in ratio of about 90 parts to 10 of acrylic acid using an organic peroxide as a copolymerization catalyst to form a copolymerization product that is subsequently crosslinked with about 1–2 weight percent of the crosslinking agent 4,5-epoxycyclohexylmethyl-4',5'-epoxycyclohexylcarboxylate.

2. The combination of claim 1 wherein said prepolymer selected is the prepolymer of bis(2-propenyl)-3,4-bis(dihydrostannano)-1,6-hexanedioate crosslinked with about 1 to 2 weight percent of a crosslinking agent selected from dimethyltin dihydride and tin tetrahydride.

3. The combination of claim 2 and additionally including one or more inert rocket motor components that contain said prepolymer which is effective in imparting an ability to stop or slow the passage of photon energy because of its capacity to absorb such energy.

4. The combination of claim 1 wherein said prepolymer selected is said copolymerization product of bis(2-propenyl)-3,4-bis(dihydrostannano)-1,6-hexanedioate and acrylic acid that is crosslinked with about 1–2 weight percent of the crosslinking agent 4,5-epoxycyclohexylmethyl-4',5'-epoxycyclohexylcarboxylate.

5. The combination of claim 4 and additionally including one or more inert rocket motor components that contain said prepolymer which is effective in imparting an ability to stop, or slow the passage of photon energy because of its capacity to absorb such energy.

* * * * *